United States Patent [19]
Klein

[11] 3,947,748
[45] Mar. 30, 1976

[54] FAULT COMMUTATION SYSTEM FOR STATIC INVERTERS

[75] Inventor: Frank Nicholas Klein, Kenosha, Wis.

[73] Assignee: Eaton Corporation, Cleveland, Ohio

[22] Filed: Feb. 18, 1975

[21] Appl. No.: 544,169

[52] U.S. Cl. .................... 321/11; 321/14; 321/45 C
[51] Int. Cl.² ......................................... H02M 1/18
[58] Field of Search ...................................... 317/16; 321/11–14, 45 C

[56] References Cited
UNITED STATES PATENTS

| | | | |
|---|---|---|---|
| 3,321,697 | 5/1967 | Etter | 321/45 C |
| 3,536,984 | 10/1970 | Rosenberry, Jr. | 321/11 |
| 3,559,034 | 1/1971 | Jensen et al. | 321/5 |
| 3,585,491 | 6/1971 | Petersen | 321/14 X |
| 3,634,728 | 1/1972 | Moury | 317/16 |
| 3,694,718 | 9/1972 | Graf et al. | 321/5 X |
| 3,755,712 | 8/1973 | DeViney et al. | 321/14 X |

Primary Examiner—William M. Shoop
Attorney, Agent, or Firm—Teagno & Toddy

[57] ABSTRACT

An inverter system having a dc input and an ac output has a fault sensor and switching provisions for diverting current to an additional path away from overloaded semiconductors of the inverter upon a fault. The system has a resonant inductance and capacitance circuit at the dc input, whose capacitance discharges through the inductance upon a fault and recharges with an opposite polarity to apply the reverse polarity to semiconductors of the inverter in an attempt to interrupt the fault. Initially the discharge of the capacitance is blocked by a second switching circuit until the fault sensor produces a fault indication signal, so that no portion of the initial charge of the capacitance is wasted by discharging into the faulting semiconductors of the inverter before the current diverting path is established.

20 Claims, 2 Drawing Figures

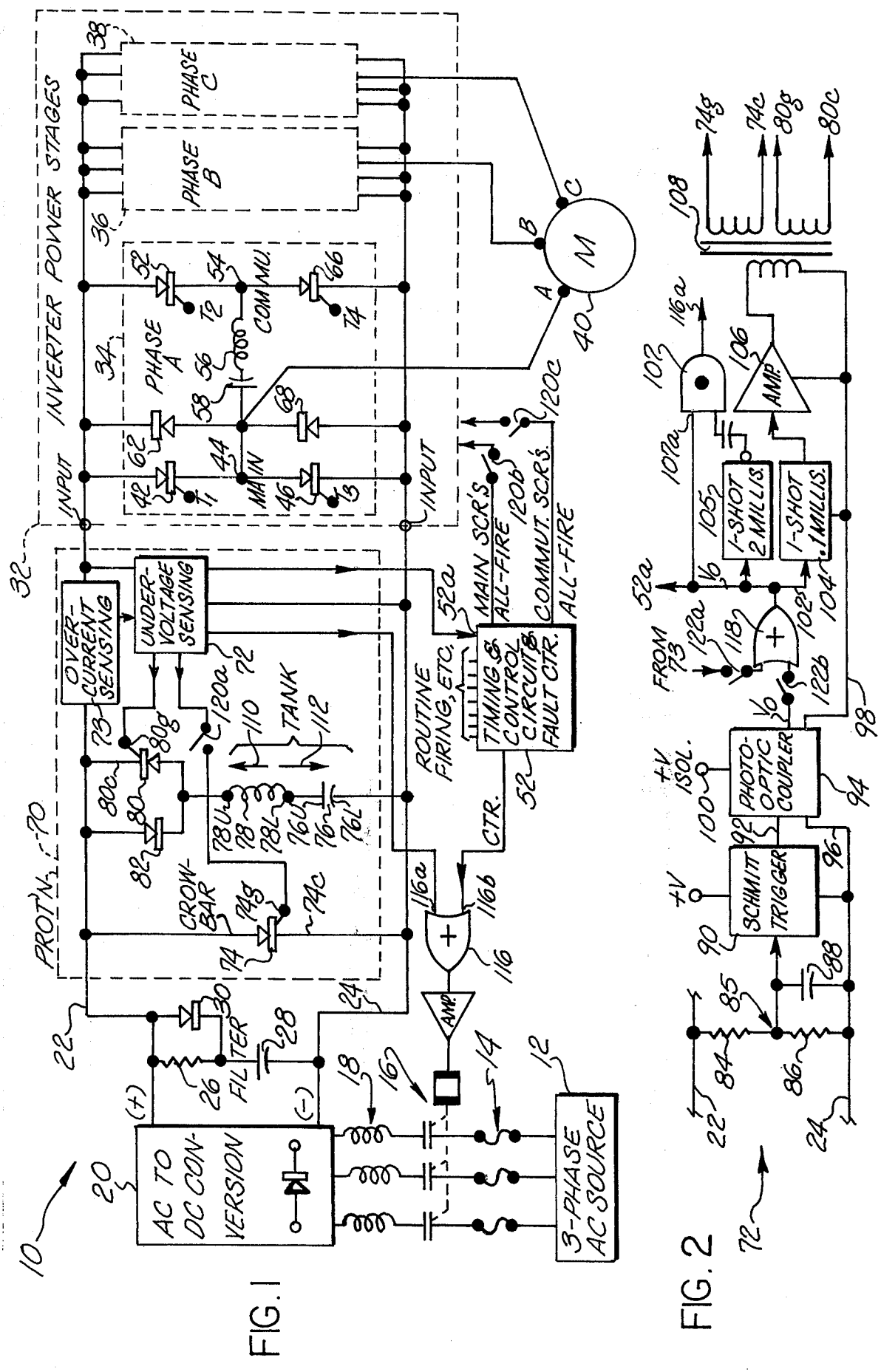

FAULT COMMUTATION SYSTEM FOR STATIC INVERTERS

BACKGROUND OF THE INVENTION

Inverters that operate from a dc source and have a plurality of semiconductors that are periodically rendered conductive and non-conductive to supply ac current to a load, are susceptible to a type of fault referred to herein as "shoot-through." A shoot-through fault is one in which an abnormal combination of the inverter's semiconductors are simultaneously conducting so that they almost completely short circuit the dc input of the inverter. In many systems the inverter semiconductors include both main semiconductors for carrying load current and commutation semiconductors. Various circuit techniques have been employed in the past to prevent the shooting-through inverter semiconductors from being destroyed by heating due to the excessive current that they conduct during a shoot-through fault.

One such protection technique is to provide switchable shunt paths for diverting at least some of the current from the shooting-through semiconductors, the shunt paths being switched into conduction when a fault sensor detects a fault and produces a fault indication signal. Some of the shunt current paths that have been employed in the prior art include a separate "crowbar" semiconductor connected across the dc input terminals of the inverter, commutation semiconductors which in the absence of a fault are employed for commutation of the main semiconductors and which are all triggered into conduction upon occurrence of the fault indication signal, and other ones of the main semiconductors that are switched into conduction en masse upon occurrence of the fault indication signal to help share the fault current. Often, an impedance is connected in series with one of the dc supply lines to limit the total fault current.

The prior art also includes fault interruption circuitry by which an attempt is automatically made to stop the fault by momentarily applying a reverse voltage to the dc input terminals of the inverter to back-bias the inverter semiconductors, whereby their conduction is stopped. One of the fault interrupting circuits that has been used for applying a reverse voltage to the dc input terminals includes a capacitor that is charged in advance of the fault to a "forward" polarity by current flowing into the capacitor while the dc input terminals have normal dc voltage. Upon a shoot-through fault, the voltage of the dc input terminals becomes very low and the capacitance discharges its current through an inductor connected in series with the capacitor, and through whatever current paths may be available, including the shooting-through inverter semiconductors and any shunt current-diverting paths that may have been additionally provided to protect the shooting-through inverter semiconductors.

When the charge on the capacitor has diminished to zero as a result of its discharge current, the capacitor current does not cease because the inductor then produces a voltage of such polarity as to cause the current to continue to flow and to charge the capacitor with reverse polarity. The reverse polarity of voltage on the capacitor is applied to the dc input terminals of the inverter so as to back-bias the inverter semiconductors, and incidentally sometime to back-bias also the additional current-diverting paths, in an attempt to clear the shoot-through fault. Reference is made for purposes of background to patent application Ser. No. 306,521 entitled, "Fuseless Inverter" and filed Nov. 15, 1972, by Thomas J. Bernhardt and Frank N. Klein, and to U.S. Pat. No. 3,321,697 to Etter, issued May 23, 1967.

In apparatus of the prior art, some of the energy initially stored in the fault clearing capacitor has been dissipated unproductively and even counter-productively because some charge from the capacitor flows through the shooting-through inverter semiconductors before the fault sensor has had sufficient time to recognize the fault and to trigger the shunt current diverting paths into conduction. This early discharge from the capacitor not only diminishes the amount of energy available for subsequently reverse-biasing the inverter semiconductors, but also causes additional heating of the already overloaded inverter semiconductors that are shooting through.

SUMMARY OF THE INVENTION

In the present invention, switching circuitry is provided that prevents the fault-clearing capacitor described above from starting to discharge its current upon a fault until the fault sensor has had sufficient time to recognize that a fault exists and to initiate conduction in the shunt current paths that divert current away from the shooting-through inverter semiconductors. Thus the present invention is an inverter system having automatic fault-interruption capability, and includes an inverter that has semiconductors to supply ac current to a load from a dc source. The inverter system also has a fault sensor which, upon a fault, produces a signal that actuates additional shunt current paths into conduction, and which also unblocks a previously blocked current path so that a charged capacitor can be recharged with reverse polarity, whereby the reverse voltage on the capacitor back-biases the inverter semiconductors in an attempt to interrupt the fault.

Accordingly, in one aspect of the invention, an inverter system is provided with a fault sensor, with switchable shunt current paths that are switched into conduction by the fault sensor after a fault has been recognized, and with a fault-interruption tank circuit that includes a switching device that prevents the start of discharge current from the capacitance of the tank circuit until the fault has been recognized by the fault sensor. Consequently, the discharge current does not start until the switchable shunt current paths are conductive so that the shunt paths can assist in conducting discharge and recharge current from the capacitance of the tank circuit while it is being recharged with reverse polarity for back-biasing the main semiconductors. The switching device is in series with the tank circuit and the resulting series circuit is in parallel with a dc input to the inverter.

In another aspect of the invention, an inverter system is provided with fault protection capability and fault interruption capability including a fault sensor, supplemental current-diverting paths for at least partially relieving the shooting-through inverter semiconductors, and a resonant circuit of inductance, capacitance, and switching means. The switching means holds off the flow of discharge current from the capacitor until the fault sensor has recognized a fault so as to be able to establish the supplemental current diverting paths, and after recognition of the fault the switching means enables the capacitance to provide current flow through the inductance and through the supplemental current-diverting paths to reverse polarize the capacitance and thereby to back-bias the shooting-through inverter semiconductors, with which the resonant circuit is connected.

In still another aspect of the invention, an inverter system is provided in which a fault sensor, which can be either an under-voltage sensor, an over-current sensor, or both, produces a fault indication signal that starts conduction in current-diverting paths, which can be a separate crowbar path, additional main semiconductors, or commutation semiconductors of the inverter, or combinations thereof, and in which a tank circuit is provided for back-biasing the inverter semiconductors, and in which a capacitive current flow which is required in the tank circuit prior to back-biasing the inverter semiconductors is blocked by a switching circuit until such time as the fault sensor produces the fault indication signal.

In a further aspect of the invention, the switching circuit for controlling conduction of the capacitor current includes a switchable semiconductor poled for conducting the discharge current in one direction upon a fault and further includes uni-directional conduction means connected in parallel with the switchable semiconductor and poled for conducting current in an opposite direction to charge the capacitance with initial polarity before a fault begins and during the back-biasing of inverter semiconductors.

In another aspect of the invention, the tank circuit is arranged to back-bias not only shooting-through inverter semiconductors but also additional shunt current-diverting paths that were rendered conductive upon the fault.

Other aspects and features of the invention are apparent from the accompanying description of a preferred embodiment, the claims, and the figures herein.

BRIEF DESCRIPTION OF THE FIGURES

FIG. 1 is a schematic circuit diagram of a preferred embodiment, in which some portions are shown in block form.

FIG. 2 is a more detailed block diagram of an under-voltage sensing device employed in the embodiment of FIG. 1.

DESCRIPTION OF A PREFERRED EMBODIMENT

In a preferred embodiment 10 of the invention, three-phase power is converted to dc power by rectification, and is inverted by a semiconductor inverter to produce controlled three-phase power for driving a motor, FIG. 1. A power source 12 provides three-phase ac current through fuses 14, through the contacts of a contactor 16, and through series-connected inductors 18 to an ac-to-dc conversion circuit 20. The conversion circuit 20 puts out dc voltage, which is positive on a bus 22 with respect to a second bus 24. Fluctuations of the dc voltage across the busses 22, 24 are reduced by a filter consisting of a resistor 26, a capacitor 28, and a diode 30 which provides for more rapid charging than discharging of the capacitor 28.

Both the positive and negative dc power busses, 22, 24 are connected to input terminals of the power stages 32 of a static inverter. A protection circuit is connected generally from the positive dc bus 22 to the negative dc bus 24. The protection circuit is the principal subject matter of the present invention, and will be described further hereinbelow.

The inverter power stages 32 include three identical subcircuits 34, 36, 38 that are used for producing phases A, B, and C respectively of three-phase output power from the power stages 32, to which a three-phase load represented by a motor 40 is connected. The circuit of the inverter power stages 32 is conventional and well known to those of ordinary skill in the art to which the present invention pertains. It is described briefly herein for convenience only.

The phase A portion 34 of the inverter power stages includes a "main" silicon controlled rectifier (i.e., SCR) 42 whose anode is connected to the dc bus 22, and whose cathode is connected to a terminal 44. A second main SCR 46 has its anode connected to the terminal 44 and its cathode connected to the negative dc bus 24. The terminal 44 provides phase A power to a conductor leading to the motor 40. In the embodiment being described, the SCR 42 is triggered into conduction once per period of the inverter's ac output wave by a triggering pulse derived from a timing and control circuit 52 and applied to a gate electrode terminal T1 of the SCR 42. The timing and control circuit 52 is conventional, well known, and used in the prior art in the United States. It establishes time intervals and supplies control signals to various elements of the entire system 10, such as the gate electrode T1 of the SCR 42.

To provide a positive lobe of phase A output current, the SCR 42 starts to conduct current from the positive dc bus 22 to the terminal 44 and thence to a phase A terminal of the motor 40; (the direction of conventional current is described). Passing through one or more windings of the motor 40, the current comes out from, at first, the phase B terminal of the motor 40, from which it enters the phase B power stage 36. The current is then conducted through a main SCR of the phase B power stage, which is located similarly to the main SCR 46 of the identical phase A power stage, and the current enters to the negative dc bus 24. After a fraction of a cycle, and with the SCR 42 continuing to conduct, the conducting main semiconductor of phase B is routinely commutated off, and the role of conveying the return current from the motor 40 to the negative dc bus 24 is taken over by a correspondingly located main SCR in the phase C power stage 38.

To terminate the positive lobe of phase A current, conduction through the main SCR 42 is terminated by momentarily applying a voltage to the cathode of the SCR 42 that is positive with respect to its anode. This turning-off, i.e., commutation, of the SCR 42 is accomplished by triggering into conduction (at gate T2) a commutation SCR 52 whose anode is connected to the positive dc bus 22 and whose cathode is connected to a junction 54. An inductor 56 and a capacitor 58 are connected in series from the terminal 54 to the terminal 44. The capacitor 58 was previously charged with a positive voltage on the capacitor plate that is connected with the terminal 44, as will be made more clear below.

Upon the start of conduction in the commutation SCR 52, the potential of the junction 54 is suddenly raised to a potential almost as high as that of the positive dc bus 22. The charge on the capacitor 58 cannot change instantaneously because rapid current flow is inhibited by the series-connected inductor 56. Consequently, when the potential of the junction 54 suddenly increases, a sudden increase is experienced also at the terminal 44, because of the charged capacitor 58. The potential of the terminal 44 is raised temporarily higher than that of the positive dc bus 22, back-biasing the SCR 42 and extinguishing conduction in it.

A diode 62 is connected so as to conduct current from the terminal 44 to the positive dc bus 22 during back-biasing of the SCR 42. Current conducted through the diode 62 and the commutation SCR 52 discharges the capacitor 58 and, because of an inertial effect provided by the inductor 56, charges that capacitor 58 thereafter with an opposite polarity, (positive at the junction 54). When current finally ceases in the inductor 56, the voltage of the capacitor 58 is such as to back-bias the commutation SCR 52 to extinguish it.

Later, when a negative lobe of phase A current is to be provided to the motor 40 from the terminal 44, the main SCR 46 is triggered (at gate T3) into conduction by the timing and control circuit 52. The anode and cathode electrodes of the main SCR 46 are connected to the terminal 44 and the negative dc bus 24, respectively. Current flows from the positive dc bus 22 through SCRs of phases B and C in turn, to the motor 40, and then out through the phase A terminal of motor 40 and through the SCR 46 to the negative dc bus 24 during the negative lobe of phase A current. To terminate the negative lobe of phase A, the main SCR 46 is commutated off in the same way as the main SCR 42 described above. That is, a second commutation SCR 66, which is poled to conduct current from the junction 54 to the negative dc bus 24, is triggered into conduction. This enables the charged capacitor 58 to apply to the terminal 44 a potential that is even more negative than the potential of the negative dc bus 24. The SCR 46 is back-biased, and an oppositely poled diode 68 in parallel with the SCR 46 discharges and recharges the capacitor 58 with positive polarity at the plate connected to the terminal 44. This new polarity back-biases the commutation SCR 66 and also provides a charge on the capacitor 58 in advance for executing the next extinction of the SCR 42 at the end of the next phase A positive lobe.

In the abnormal event that two main SCRs or two commutations SCRs associated with the same phase conduct simultaneously, a short circuit is produced from the positive dc bus 22 to the negative dc bus 24. For example, the main SCRs 42, 46 of the phase A subcircuit 34 may conduct simultaneously by mistake; this condition is referred to as a shoot-through fault. The resulting current, although limited somewhat by the inductors 18, would damage the shooting-through SCRs if it continued more than a very short time. To protect the SCRs of the inverter against shoot-through faults and certain other faults that may occur, a protection circuit 70 is provided. The protection circuit not only relieves the shooting-through SCRs as quickly as possible of the burden of carrying the entire short circuit current, but also automatically back-biases the shooting-through SCRs in an attempt to eliminate the fault and restore normal operation without manual intervention. The technique employed by the protection circuit 70 is to sense the occurrence of a fault at the dc busses 22, 24 and promptly to divert some current away from the shooting-through inverter semiconductors by establishing at least one additional current path in parallel with the shooting-through semiconductors, and shortly thereafter to back-bias the shooting-through semiconductors and the additional path semiconductor in an attempt to eliminate the fault and reset the protection circuit.

The protection circuit 70 includes an under-voltage sensing device 72, an overcurrent sensing device 73, a crowbar SCR 74 for diverting current from the shooting-through semiconductors by establishing a short circuit across the dc busses, a tank circuit comprising a capacitor 76 and an inductor 78 for commutating off the shooting-through inverter SCRs and the protection SCR 74, and a switching circuit that is very important to the invention and that includes an SCR 80 and a diode 82. The under-voltage sensing circuit 72 is connected to sense the voltage difference between the positive dc bus 22 and the negative dc bus 24 and to produce triggering pulses when that voltage decreases through a predetermined threshold level. The threshold level is less than the voltage normally occurring across the dc busses 22, 24 in the absence of a fault. One triggering pulse produced by the under-voltage sensing circuit 72 is applied to a gate electrode 74g of the SCR 74, whose anode is connected to the positive dc bus 22 and whose cathode is connected to the negative dc bus 24. A second triggering pulse produced at the same time by the sensing circuit 72 is applied to a gate electrode 80g of the SCR 80 for purposes described below. A third triggering pulse produced 2 milliseconds later by the device 72 starts the contactor 16 toward opening, unless the fault has been cleared before the 2 millisecond delay expires, as will be described further below. Because of its inertia, the contactor 16 requires 20 milliseconds thereafter to open.

A diagram of a suitable under-voltage sensing circuit 72, FIG. 2, has the voltage of the busses 22, 24 applied to two series-connected resistors 84, 86. A capacitor 88 connected in parallel with the resistor 86 to the bus 24 cooperates with the resistors 84, 86 to provide a low-pass filter that prevents the under-voltage sensing device 72 from operating in response to noise on the dc busses. The capacitor 88 introduces a delay of less than 0.5 millisecond in sensing. A signal from a junction 85 of the voltage divider resistors is connected to an input of a conventional Schmitt trigger 90, which has a predetermined transition voltage. A voltage across the dc busses that causes transition of the Schmitt trigger is referred to herein as the threshold voltage. For values of a voltage at the junction 85 in excess of the transition voltage the output of the Schmitt trigger 90 is a high first voltage level, and for junction voltage values below the transition level the output voltage of the Schmitt trigger is a second voltage level lower than the first.

The output voltage of the Schmitt trigger 90 is connected by a conductor 92 to a photo-optic coupler 94 of a conventional commercially available type, whose other input terminal 96 is connected to the negative dc bus 24. The photo-optic coupler 94 is employed for dc isolation between its input and output circuits. The output side of the photo-optic coupler 94 has an isolated common terminal 98 and an isolated fixed supply voltage terminal 100. An output signal Vo from the photo-optic coupler, which passes through a switch 122b and an OR gate 118 and appears on a conductor 102, is a relatively high voltage level in the presence of an under-voltage fault and a relatively low voltage level in the absence of an under-voltage fault. When the fault produces a fault signal at the conductor 102, the timing and control circuit 52 receives a fault signal command on a terminal 52a from the conductor 102, that disables the normal routine of firing of the inverter power stage SCRs, in the embodiment now being described. The conductor 102 is connected to a oneshot multivibrator 104 whose 0.1 millisecond output pulse produced at the leading edge of a fault signal on conductor 102, is amplified by a power amplifier 106. The output of the power amplifier 106 drives a primary winding of a transformer 108 that has two secondary windings. The two ends 74g, 74c of the first secondary winding are connected to the gate and cathode respectively of the crowbar SCR 74 and the two ends 80g, 80c of the second secondary winding are connected to the gate and cathode respectively of the tank SCR 80.

The capacitor 76 is charged before occurrence of a fault to a positive voltage on its upper plate 76U by a flow of current from the positive dc bus 22 through the diode 82 and through the inductor 78 to the upper plate 76U. Thus the capacitor 76 is charged in advance to a voltage which is almost equal to the peak value of voltage occurring on the dc bus 22. When the voltage of the positive dc bus 22 starts to decrease as a result of a fault, the charge from the capacitor 76 cannot leak off; the diode 82 blocks discharge current and the tank SCR 80 also blocks discharge current because the tank SCR 80 has not been triggered into conduction as yet. Even after the voltage on the dc bus 22 has declined below the threshold voltage, the capacitor 76 does not discharge until such time as the under-voltage sensing circuit 72 has had sufficient time to recognize that a fault level of voltage does exist on the dc busses, and to produce a triggering signal that renders the crowbar SCR 74 and the tank SCR 80 conductive.

When the dc voltage between the busses 22 and 24 decreases so low and so long as to operate the Schmitt trigger 90, the signal Vo becomes a high voltage, signifying a fault. Thereupon, the one-shot multivibrator 104 produces an output pulse which is amplified by the amplifier 106, isolated and transformed by the transformer 108, and applied to the gate electrodes of the SCRs 74 and 80 to trigger both of those SCRs into conduction. Current passes through the conductive crowbar SCR 74, diverting most of the current that was previously conducted by shooting-through SCRs of the inverter power stages, for example, SCRs 42 and 46. At the same time, the start of conduction of the tank SCR 80 provides a path through which the capacitor 76 can transmit current to the positive dc bus 22.

In the embodiment being described the crowbar SCR 74 and the tank SCR 80 are rendered conductive simultaneously. Although such simultaneous triggering is not necessary, it is important in the present invention that no more than a negligible amount of current be permitted to flow from the capacitor 76 through the tank SCR 80 before the crowbar SCR 74 is rendered conductive. In circuits of the prior art, the tank SCR 80 was not provided and the capacitor 76 started to discharge before the crowbar SCR 74 was rendered conductive. Discharge current from the capacitor 76 in the prior art flowed initially through the shooting-through SCRs of the inverter power stages. This was undesirable for several reasons. First, this discharge current aggravated the current overload situation of the shooting-through SCRs of the inverter power stages by adding still more current to their load, and it therefore increased the likelihood of damaging the shooting-through SCRs thermally. Secondly, current discharged from the capacitor 76 that passed through the shooting-through SCRs thereby traversed circuit elements having a higher voltage drop than the crawbar SCR 74 from the positive dc bus 22 to the negative dc bus 24, and therefore dissipated more power than in the present invention, wasting stored commutation energy.

In the present invention, the voltage of the positive dc bus 22 with respect to the negative dc bus 24 is made smaller during the fault by conduction of the crowbar SCR 74 before any appreciable amount of current is discharged from the tank capacitor 76. As a result, a greater amount of the initially stored energy of the tank capacitor 76 is available to charge the tank capacitor 76 in the reverse direction. When an attempt is made subsequently to restore the inverter automatically to normal operation, this greater amount of energy remaining after reverse-polarity recharging of the capacitor 76 makes it easier for the capacitor 76 to commutate off the shooting-through SCRs of the inverter power stages and the crowbar SCR 74.

For the reasons just described, discharge of the capacitor 76 is delayed by the tank SCR 80 until such time as the under-voltage sensing circuit 72 recognizes an under-voltage fault and supplies triggering signals to the tank SCR 80 and the crowbar SCR 74. A shunt current diverting path is then available through the crowbar SCR 74 for conduction of discharge current from the capacitor 76 immediately at the start of the discharge of the capacitor 76. As the capacitor 76 discharges through the series inductor 78, the tank SCR 80 and the crowbar SCR 74, the positive voltage on the plate 76U of capacitor 76 decreases to zero. The current of the capacitor 76 does not stop at that time, however, because the inductor 78 then produces a positive voltage at its upper terminal 78U with respect to its lower terminal 78L which is connected to the capacitor plate 76U. As a result, current continues to flow for a time in the direction of an upward arrow 110 of FIG. 1 and the capacitor 76 becomes charged with a polarity on its lower plate 76L which is positive with respect to its upper plate 76U.

Finally, the capacitor current does cease to flow in the direction 110, whereupon current starts to flow from the capacitor 76 in an opposite direction shown by the arrow 112. This current flow is from the capacitor plate 76L, through the diodes 68 and 62 of the phase A inverter power stage 34, and through similar diodes in the phase B module 36 and the phase C module 38. This current continues to the positive dc bus 22, through the diode 82, through the inductor 78 and thence to the upper plate 76U of the capacitor 76. While the current flows in the direction 112 a positive voltage is applied to the dc bus 24 with respect to the dc bus 22. This has the effect of back-biasing the shooting-through SCRs of the inverter power stages such as the SCRs 42 and 64. The shooting-through SCRs could, of course, be the commutation SCRs of any of the three phases, for example, the commutation SCRs 52 and 66 of phase A.

The positive voltage applied by the capacitor 76 to the dc bus 24 with respect to the dc bus 22 also serves to back-bias, (i.e. reverse-bias) the crowbar SCR 74, thereby extinguishing conduction in the crowbar SCR 74. The tank SCR 80 is also back-biased. After a time the back-biasing current ceases and the potential of the dc bus 22 becomes positive. If the shoot-through fault is eliminated by the back-biasing, the potential of the bus 22 rises to a normal positive value with respect to that of the dc bus 24, and the fault has been eliminated without need for any intervention by an operator. Following an attempt to eliminate the fault by back-biasing, several situations are possible. If the attempt to clear the fault is successful, so that both the crowbar and the inverter power stage SCRs cease conduction as a result of the back-biasing, the voltage across the dc busses 22, 24 rises above the threshold level of the under-voltage sensing circuit 72, and the signal Vo at the conductor 102 changes from a fault signal level to a normal signal level. This change to a normal signal level serves as a restart command from the conductor 102 to the timing and control circuit 52. The restart command starts an orderly restarting sequence, controlled by the timing and control circuit 52, which produces firing pulses for the inverter power stage SCRs in the orderly predetermined starting sequence.

In the event that the crowbar SCR 74 and the shooting-through inverter power stage SCRs are both extinguished by the back-biasing action, but the inverter SCRs start shooting through again as the bus voltage rises, another under-voltage condition results, which is sensed by the under-voltage sensing device 72, and another attempt is made automatically to extinguish the fault. The SCRs are preferably sized for only intermittent fault duty; consequently, it is necessary to prevent continuous recycling of the fault recovery system. For this purpose, the signal of the conductor 102 can be connected to a fault counter in the block 52 which, upon counting a third fault, produces an output signal. The output signal enters an input 116b of an OR circuit 116 to trip the contactor 16, disconnecting the equipment from the ac power source 12. The fault counter has a reset input for receiving a reset pulse which is produced by a clocking oscillator to reset the fault counter to zero once per minute.

In the event that the back-biasing fails to relieve the fault in the power stages, but conduction in the crowbar SCR 74 has ceased, the under-voltage sensing circuit 72 continues to sense a fault because the voltage across the dc busses 2, 24 remains low. After 2 milliseconds a one-shot multivibrator 105, whose output pulse was started at the beginning of the fault signal on the conductor 102, times out, and the trailing edge of its 2 millisecond output pulse actuates the contactor 16 to start its 20 millisecond disconnect action. In situations in which the fault signal at the conductor 102 persists for less than 2 milliseconds, the 2-millisecond output pulse from the one-shot multivibrator 105 is blocked from actuating the contactor 16 by a 0 signal on an input 107a of an AND circuit 107.

Upon the back-biasing of the crowbar SCR 74 and the inverter power stage SCRs, if the inverter power stage SCRs recover but for some reason the crowbar SCR 74 does not recover, the undervoltage sensing circuit continues to sense a fault and the one-shot multivibrator 105 sends a trip signal to the contactor OR gate 116 to open the contactor 16.

The tank SCR 80 and its associated circuitry can be employed equally well when no separate crowbar SCR such as the SCR 74 is provided, but instead current is diverted from the shooting-through SCRs by triggering other main SCRs into conduction in previously non-conducting legs of the power inverter. It is also clear that commutation SCRs instead of main SCRs or instead of a separate crowbar SCR could be triggered into conduction to assist in sharing the load of the shooting-through SCRs. Moreover, any combination of these various current diverting paths could be employed to come to the aid of the shooting-through SCRs in carrying the short-circuit current. Switches 120a, 120b, and 120c of FIG. 1 provide for selection of current diverting paths.

The current overload sensing device 73 connected in series circuit with the dc bus 22 in the illustrated embodiment, could be employed instead of or in addition to the under-voltage sensing device 72 to initiate conduction in the protective additional shunt current paths and to trigger the tank SCR 80 into conduction. The over-current sensor 73 includes a series resistor, an amplifier, a Schmitt trigger, and a photo-optical coupler very much as shown in the voltage sensor of FIG. 2. Sensors are selected by switches 122a and 122b, FIG. 2.

The line disconnect device 16 is shown in the preferred embodiment as a contactor, but other types of line disconnect devices could be used instead.

In embodiments in which inverter SCRs are fired (an all-fire protection scheme instead of a crowbar protection scheme), the fault indicating signal from the conductor 102 to the control circuit 52 causes six or perhaps all 12 of the inverter SCRs to be fired into conduction.

What is claimed is:

1. An inverter system that supplies power to an ac load from a dc source comprising inverter means having input terminals connected with said dc source and output terminals connectable for delivering the ac power to the load and having a plurality of inverter semiconductor means each periodically rendered conductive and non-conductive, sensing means for sensing a fault in which at least some of said inverter semiconductor means experience a current overload and for producing a fault indication signal, first switching circuit means connected with said fault sensor and responsive to said fault indication signal and connected for diverting thereupon at least a portion of current from said overloaded inverter semiconductor means, capacitance means for storing electrical energy, means for charging said capacitance means to a first polarity, inductance means for storing electrical energy and connected in series with said capacitance means, second switching circuit means connected in series with said capacitance means and said inductance means for blocking and unblocking current flow therethrough, the series circuit of said capacitance means, inductance means and second switching circuit means being connected in parallel with said dc source, said second switching circuit means being responsive to said fault indication signal not earlier than said current portion is diverted to discharge said capacitance means by current flow through said second switching means and said inductance means and to recharge said capacitance means with polarity opposite from said first polarity, said capacitance means being connected with said inverter input terminals so as to apply said opposite polarity to said inverter input terminals, whereby an attempt is made to interrupt said fault.

2. An inverter system as defined in claim 1 and wherein said first switching circuit means comprises separate semiconductor switching means connected in parallel with said dc source and distinct from said inverter semiconductor means.

3. An inverter system as defined in claim 2 and wherein said separate parallel semiconductor switching means comprises triggerable avalanche semiconductor means, and wherein said capacitance means is connected so as to apply said opposite polarity to said separate parallel semiconductor switching means to interrupt conduction of said separate parallel semiconductor switching means.

4. An inverter system as defined in claim 1 and wherein said first switching means comprises means for initiating conduction in at least some of otherwise non-conducting ones of said inverter semiconductor means for diverting said portion of current from said overloaded inverter semiconductor means.

5. An inverter system as defined in claim 1 and wherein said second switching circuit means comprises second semiconductor switching means poled for conducting said capacitor current to discharge said first polarity of said capacitance means and recharge said capacitance means with said opposite polarity, and wherein said means for charging said capacitance means to said first polarity comprises uni-directional current conduction means effectively in parallel with said second semiconductor switching means and poled for conducting current oppositely of said second conductor switching means.

6. An inverter system as defined in claim 5 and wherein second switching circuit means comprises SCR means, and said uni-directional current conduction means for charging said capacitance means to said first polarity comprises diode means connected from said dc source to said capacitance means.

7. An inverter system as defined in claim 1 and wherein said sensing means comprises voltage sensing means for sensing the voltage of said dc source for producing said fault indication signal when said voltage is below a predetermined threshold.

8. An inverter system as defined in claim 1 and wherein said sensing means for sensing a fault comprises current sensing means for sensing the current flowing to said inverter means from said dc source and for producing said fault indication signal when said current is above a predetermined threshold.

9. An inverter system that supplies power to an ac load from a dc source comprising inverter means having output terminals connected for delivering the ac power to the load, said inverter means including a plurality of inverter semiconductor means each periodically rendered conductive and non-conductive, sensing means for sensing a fault in which at least some of said inverter semiconductor means have a current overload and for producing a fault indication signal thereupon, first switching circuit means connected with said fault sensing means and responsive to said fault indication signal and connected for diverting thereupon at least a portion of current from said overloaded inverter semiconductor means, capacitance means for storing electrical energy, means for charging said capacitance means to a first polarity, inductance means for storing electrical energy and connected in series with said capacitance means, second switching circuit means connected in series with said capacitance means and said inductance means for blocking and unblocking current therethrough, said second switching circuit means being responsive to said fault indication signal not earlier than said current portion is diverted to discharge said capacitance means by capacitor current flowing through said second switching means and said inductance means and flowing at least in part through said first switching circuit means to recharge said capacitance means with polarity opposite from said first polarity, said capacitance means being connected with said inverter input terminals so as to apply said opposite polarity to said inverter input terminals, whereby an attempt is made to interrupt said fault.

10. An inverter system that supplies power to an ac load from a dc source comprising inverter means having an input connected with said dc source and having output terminals connected for delivering the ac power to the load, said inverter means including a plurality of inverter semiconductor means each periodically rendered conductive and non-conductive, sensing means for sensing a fault in which at least some of said inverter semiconductor means have a current overload and for producing a fault indication signal, first switching circuit means connected with said fault sensor and responsive to said fault indication signal for diverting thereupon at least a portion of current from said overloaded inverter semiconductor means, capacitance means for storing electrical energy, means for charging said capacitance means to a first polarity, inductance means for storing electrical energy and in series with said capacitance means, second switching circuit means connected in series with said capacitance means and said inductance means for blocking and unblocking current flow therethrough said second switching circuit means being responsive to said fault indication signal not earlier than said current portion is diverted to discharge said capacitance means by capacitor current flowing through said second switching circuit means and said inductance means and to recharge said capacitance means with polarity opposite from said first polarity, said capacitance means being connected with said inverter input terminals so as to apply said opposite polarity to said inverter input, whereby an attempt is made to interrupt said fault.

11. An inverter system as defined in claim 10 and wherein said first switching circuit means comprises separate switchable semiconductor means distinct from said inverter semiconductor means and for diverting said portion of current from said overloaded inverter semiconductor means.

12. An inverter system as defined in claim 11 and wherein said separate switchable semiconductor means comprises SCR means.

13. An inverter system as defined in claim 11 and wherein said capacitance means is connected so as to apply said opposite polarity to said separate switchable semiconductor means to terminate current conduction in said separate switchable semiconductor means.

14. An inverter system as defined in claim 10 and wherein said first switching circuit means comprises means for initiating conduction in at least some of those of said inverter semiconductor means that were otherwise non-conductive for diverting said portion of current from said overloaded inverter semiconductor means.

15. An inverter system as defined in claim 10 and wherein said means for charging said capacitance means to a first polarity comprises uni-directional current conduction means connected with said dc source and with said capacitance means for charging said capacitance with said first polarity prior to said fault.

16. An inverter system as defined in claim 15 and wherein said uni-directional conduction means for charging said capacitance means to said first polarity comprises diode means connected from said dc source to said capacitance means.

17. An inverter system as defined in claim 10 and wherein said second switching means comprises SCR means.

18. An inverter system as defined in claim 10 and wherein said plurality of semiconductor means of said inverter means comprises a first plurality of main semiconductor means for conducting current to said load and a second plurality of commutation semiconductor means for interrupting current flow in said main semiconductor means, and wherein said first switching circuit means comprises means for rendering conductive all semiconductor means of at least one of said first and second plurality of semiconductor means.

19. An inverter system as defined in claim 10 and wherein said sensing means comprises voltage sensing means for sensing the voltage of said dc source and for producing said fault indication signal when said voltage is below a predetermined threshold.

20. An inverter system as defined in claim 10 and wherein said sensing means for sensing a fault comprises current sensing means for sensing the current flowing to said inverter means from said dc source and for producing said fault indication signal when said current is above a predetermined threshold.

* * * * *